UNITED STATES PATENT OFFICE.

FREDERICK PROESCHER, OF SIOUX CITY, IOWA.

ARTIFICIAL CULTIVATION OF THE HOG-CHOLERA VIRUS.

1,334,318.　　　　　Specification of Letters Patent.　　Patented Mar. 23, 1920.

No Drawing.　　　Application filed January 27, 1919.　Serial No. 273,238.

*To all whom it may concern:*

Be it known that I, FREDERICK PROESCHER, a citizen of the United States, residing at Sioux City, in the county of Woodbury and State of Iowa, have invented an Artificial Cultivation of the Hog-Cholera Virus Suitable for Prevention and Cure of Hog Cholera, of which the following is a full, clear, and exact description.

My invention has relation to the artificial cultivation of the hog-cholera virus from the natural virus by means of new culture media which I have discovered. These culture media may also be used for the making of subcultures.

The artificially grown virus or cultures produced by my invention are used for the active immunization of hogs, and also for the production of anti-hog-cholera serum for rendering hogs immune to hog-cholera.

The desirability of producing hog-cholera virus by artificial methods has long been recognized, and such a method has been widely sought, by reason of its manifest advantages. This result has not, to my knowledge, been previously attained for various reasons. In the first place, the hog-cholera micro-organism, on account of its extremely small size, belongs to the class of filterable viruses, and has heretofore been regarded as invisible. Furthermore, these micro-organisms are very difficult to grow outside the living organisms in which they naturally grow, and they can be made to grow artificially only in specially prepared culture media.

I have discovered that it is possible to render such organisms visible by special staining methods; and have also invented culture media in which such organisms can be successfully cultivated, both in primary cultures and in subcultures.

The present invention has more particular reference to the general method of cultivation of the artificial virus, the particular culture media and the methods of preparing such culture media, and other novel features as herein set forth, and as claimed.

The hog-cholera micro-organism is a minute coccus on the limit of microscopial visibility, being about one-tenth micron in diameter. It occurs either as a single coccus, or arranged in pairs, or as short chains or conglomerated cocci. I have discovered that the micro-organism can be made visible in the primary lesions by staining with methylene azure or methylene violet, or in general, with staining solutions containing anilin dyes belonging to the thiazin group. As a rule, the virus is most excellently stained with the free base of methylene azure.

The virus can be cultivated from the blood and urine or the organ juices from all the infected organs. For practical purposes the cultivation of the virus from the blood or filtered organ juice is the most suitable method. The virulence of the artificially cultivated virus can be attenuated by means of well known physical and chemical agencies, such as heating to a certain degree, the addition of chemicals, such as carbolic acid, etc. These methods are well known in the preparation of bacterial vaccins, and are intended for use in the production of a hog-cholera vaccin.

The blood of pigs suffering from natural hog-cholera infection is usually contaminated with secondary invaders such as *Bac. Suisepticus*, *Suipestifer* and other members of the paratyphoid and enteritis group, and which will interfere with the cultivation of the virus. It is, therefore, necessary to remove the secondary invaders by filtration and to infect healthy susceptible pigs with filtered virus. For the filtration a dense porcelain filter may be used. Experience has shown that the blood of pigs from the fifth to seventh day of the disease is usually sufficiently free of secondary invaders and contains the hog-cholera virus in a sufficiently pure state, to use after filtration, for the production of a pure culture.

For the artificial cultivation of the virus from the blood, the infected pig is bled to death aseptically. The blood is preferably kept fluid with sodium citrate, using 30 cubic centimeters of a 20% solution to 1000 cubic centimeters of blood. Instead of using blood so obtained, filtered serum or hemolyzed blood may be used, and also the filtered juice from the organs of infected pigs, such as heart, lungs, kidneys, spleen, liver and lymph glands.

The term "virus" as used herein and in the claims will be understood to apply to any or all of these substances.

As above stated, the hog-cholera virus will not grow in common culture media. In the practice of my discovery, I have observed that the best growth is observed in compound culture media made from pig's organs and blood with the addition of other suitable culture media prepared from the tissue of other animals such as cattle, goats, rabbits, fowls, sheep, horses and so forth. Human and animal transudates and exudates may be used. For continuous growths on these media the addition of hemoglobin and serum and fresh or auto-claved tissue, preferably spleen, is essential. It is also advisable that one at least, of these ingredients be derived from pigs, the virus thereby growing better.

For the cultivation of the virus, culture media composed of a solution of completely hydrolyzed protein containing amino-acids and polypeptides and containing hemolyzed blood, (dissolved hemoglobin) can also be employed.

The following culture media, together with methods of preparing the same are typical examples.

*Culture Medium No. 1.*

(1.) Hog serum is diluted 1 to 5 or 1 to 8 with distilled water and autoclaved at ten pounds pressure for thirty minutes.

(2.) 500 grams lean minced beef meat are mixed with 1000 cubic centimeters distilled water and autoclaved for one hour at ten pounds pressure, filtered and 1% peptone added to the filtrate. The peptone broth or bouillon is autoclaved for fifteen minutes at ten pounds pressure and filtered again.

(3.) 500 grams fresh minced hog kidneys mixed with 1000 cubic centimeters water is autoclaved for one hour then filtered and 1% peptone is added to the filtrate. The mixture is then autoclaved again for fifteen minutes and again filtered.

(4.) The three ingredients thus prepared are then mixed in the following proportions:
  1000 cubic centimeters hog serum water,
  1000 cubic centimeters beef bouillon,
  400 cubic centimeters kidney bouillon,
  .3% dextrose.

(5.) Add normal sodium and potassium hydroxid solution to such an extent that 10 cubic centimeters of the mixture will require preferably for exact neutralization, not more than two-tenths cubic centimeters of a one-tenth normal hydrochloric acid solution, using phenol red as indicator.

*Culture Medium No. 2.*

(1.) Hog serum water made as described above.

(2.) Beef bouillon made as described above.

(3.) Kidney bouillon made as described above.

(4.) The mucous membrane of several cleansed and washed hog stomachs is removed, ground finely and treated as follows:
  500 grams minced mucous membrane,
  1000 cubic centimeters distilled water,
  10 cubic centimeters hydrochloric acid (chemically pure).

This mixture is kept at a temperature of 50 degrees C., for twenty-four hours; is then filtered through absorbent cotton then sterilized in the autoclave for fifteen minutes at ten pounds pressure. The mixture is then filtered and neutralized at room temperature with a normal sodium and potassium hydroxid solution, making the mixture slightly alkaline to phenol red. It is then autoclaved again for fifteen minutes at ten pounds pressure; then filtered through asbestos wool to get a clear filtrate.

(5.) The four ingredients thus prepared are then mixed in the following proportions:
  400 cubic centimeters beef bouillon,
  100 cubic centimeters kidney bouillon,
  400 cubic centimeters hog stomach digest,
  400 cubic centimeters hog serum water,
  .3% dextrose, The mixture is then adjusted to the same alkalinity as under the first culture medium.

*Culture Medium No. 3.*

(1.) An equal volume of hog stomach digest, after it has been kept for 24 hours and 50° C., and filtered through cotton, is mixed with an equal volume of hog serum, and is digested again for 24 hours, at 50° C. At the end of the 24 hours, the mixture is autoclaved for 30 minutes at 10 pounds pressure. If the digesting is carried out properly a little sediment will be formed by the autoclaving. The hot mixture is then filtered through absorbent cotton or filter paper and neutralized with a mixture of normal sodium and potassium hydroxid solution, using phenol red as an indicator. After neutralizing, the mixture is again autoclaved for 15 minutes at 10 pounds pressure and filtered again.

(2.) To 1000 cubic centimeters of digested hog serum and beef bouillon, mixed equally, are added 200 cubic centimeters kidney bouillon and .3% dextrose. The beef and kidney bouillon are made as described under Culture Medium No. 1. The mixture is adjusted to the same alkalinity as described under Culture Medium No. 1.

*Making the culture.*

Either one of the three above described culture media may be filled in test tubes or flasks, and to each test tube or flask a piece of fresh pig spleen is added before sterilizing. About 3% of spleen is a suitable amount. Sterilize three times in streaming steam, for 15 minutes, for three consecutive days.

To the above described sterilized medium is added under sterile precautions, sterile hemolyzed pig's blood. To 100 cubic centimeters culture medium 5-16 cubic centimeters hemolyzed blood is added. Defibrinated blood from normal (not vaccinated) pigs is hemolyzed with distilled water in proportion 1:1. The hemolyzed blood is then filtered through asbestos wool until clear, then through a coarse porcelain filter and finally through a dense porcelain filter. Before adding the filtered hemolyzed blood it should be tested for sterility.

The culture media above described may be used for making cultures from natural virus. For this purpose the aseptically drawn blood or filtered organ juice of a pig infected with hog-cholera is added to these culture media in the proportion of from .5 to 3 cubic centimeters of blood to 10 cubic centimeters of the culture media. The tubes are kept at approximately 37 degrees temperature for from 3 to 8 days. If growth takes place a diffuse slight cloudiness is observed. For microscopical examination a few drops of culture are taken and smears made direct; or better, the culture is diluted with sterile water in proportion 1:10, is centrifuged, and smears are made of the sediment. The smears are stained with Gram solution and counter-stained with concentrated carbolfuchsin for one-half minute. The micro-organisms usually occur in clumps as very minute Gram negative cocci.

The artificial virus may be used for the production of anti-hog-cholera serum or for the active immunization (in the form of attenuated vaccin) or for the simultaneous immunization for pigs and hogs.

Instead of using the whole culture, the virus may be centrifuged therefrom and the sediment taken up with sodium chlorid solution of about .85% and the emulsified sediment used for injection.

It will be understood that the culture media described above are typical only and that other culture media, possessing similar characteristics and brought to the proper ion-concentration, may be employed. It will also be understood that the methods of making the culture media which I have described and the proportions given are those which I have found to give good results. I do not desire to limit myself thereto as many modifications and variations will readily occur to bacteriologists skilled in this art.

The terms "pig" and "hog" are used interchangeably throughout this specification and the claims thereof.

I claim:

1. The herein described method for the artificial cultivation of the hog-cholera virus which consists in obtaining a virus-containing material from infected pigs and free from secondary invaders, and adding such virus-containing material to a culture medium prepared from animal tissue, and adjusted to an ion-concentration approaching neutrality and thereafter maintaining the culture medium under conditions favorable for the development of the micro-organism.

2. The herein described method for the artificial cultivation of the hog-cholera virus, which consists in making an animal serum water, mixing the same with a bouillon made from the tissue of animals and also with a bouillon made from kidney tissue, adjusting the mixture to a very slight degree of alkalinity, adding carbohydrate thereto, adding spleen thereto and sterilizing, then adding sterile hemolyzed blood, and mixing the sterile culture medium with the virus, and thereafter maintaining the culture medium under conditions favorable for the development of the micro-organism.

3. The herein described method for the artificial cultivation of the hog-cholera virus, which consists in making a hog serum water, mixing the same with a bouillon made from tissue of animal other than hog, and also with the bouillon made from the hog kidney and digested hog stomach, adjusting the mixture to an ion-concentration approaching neutrality, adding dextrose, placing the medium in a container, adding pig's spleen, sterilizing, adding hemolyzed blood, and mixing the sterile culture medium with the virus, and incubating until the micro-organisms are sufficiently developed.

4. The herein described method for the artificial cultivation of the hog-cholera virus which consists in digesting hog serum, mixing the same from a bouillon made from the tissure of animal other than hog and also with a bouillon made from hog kidney, adjusting the mixture to a very slight degree of alkalinity, adding dextrose, placing the medium in a container, adding pig spleen, sterilizing, then adding hemolyzed blood, and mixing the sterile culture medium with the virus, and incubating until the micro-organisms are sufficiently developed.

5. The method of cultivating the hog-cholera virus, which consists in growing the same in a medium consisting of a bouillon made from animal tissue and adjusting to a very small degree of alkalinity, said medium containing also spleen and hemolyzed blood to promote continuous growth in the subculture.

6. The method of cultivating hog-cholera virus which consists in growing the same in a medium containing a bouillon made from animal tissue and containing spleen and hemolyzed blood, at least one of said ingredients being derived from pig.

7. A culture medium for the artificial cultivation of hog-cholera virus comprising a mixture of serum water, a bouillon made from animal tissue and hemoglobin.

8. A culture medium for the artificial cultivation of hog-cholera virus comprising a mixture of serum water, a bouillon made from animal tissue, a bouillon made from kidneys, and hemoglobin, at least one of said ingredients being produced from pig.

9. A culture medium for the artificial cultivation of hog-cholera virus, comprising a mixture of hog serum water, a bouillon made from the tissue of animals other than hogs, and a bouillon made from hog kidneys, together with a carbohydrate.

10. A culture medium for the artificial cultivation of hog-cholera virus, comprising a mixture of hog serum water, a bouillon made from animal tissue and a bouillon made from kidneys, together with a carbohydrate and pig spleen.

11. A culture medium for the artificial cultivation of hog-cholera virus, comprising a mixture of hog serum water, a bouillon made from the tissue of animals other than hogs, and a bouillon made from hog kidneys, together with dextrose, pig spleen and hemolyzed blood.

12. A culture medium for the artificial cultivation of hog-cholera virus comprising a mixture of hog serum water, a bouillon made from the tissue of animals other than hog, and a bouillon made from hog kidneys and digested hog stomachs.

13. A culture medium for the artificial cultivation of hog-cholera serum, comprising a mixture of hog serum water, a bouillon made from the tissue of animals other than hogs, and a bouillon made from hog kidneys and digested hog stomachs, together with dextrose and hog spleen.

14. A culture medium for the artificial cultivation of hog-cholera virus, comprising a mixture of hog serum water, a bouillon made from the tissue of animals other than hogs, and a bouillon made from hog kidneys and digested hog stomachs, together with dextrose and hog spleen and hemolyzed blood.

15. A culture medium for the artificial cultivation of hog-cholera virus, prepared from animal tissue and adjusted to proper alkalinity, and also containing pig spleen and hemolyzed pig blood.

16. A culture medium for the artificial cultivation of hog-cholera virus, prepared from animal tissue other than hog tissue, and containing hog spleen and hemolyzed hog blood.

17. A culture medium suitable for the artificial cultivation of hog-cholera virus, comprising a mixture of animal tissue broths containing a dissolved hemoglobin.

18. In the production of artificial hog-cholera virus the steps of removing all secondary organisms from a juice from an infected hog, inoculating therewith a culture medium containing hemoglobin, and maintaining the culture medium under conditions proper for the development of the virus.

19. As a new product, an artificial pure culture of hog cholera virus, in a nutrient medium containing dissolved hemoglobin.

20. As a new product, an attenuated artificial pure culture of hog cholera virus, in a nutrient medium containing dissolved hemoglobin.

In testimony whereof I have hereunto set my hand.

FREDERICK PROESCHER.